(12) United States Patent
Hahn et al.

(10) Patent No.: US 9,288,799 B2
(45) Date of Patent: *Mar. 15, 2016

(54) METHOD AND APPARATUS FOR SELECTING CARRIER IN WIRELESS COMMUNICATION SYSTEM

(75) Inventors: Gene Beck Hahn, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 103 days.

This patent is subject to a terminal disclaimer.

(21) Appl. No.: 14/129,664

(22) PCT Filed: Jul. 24, 2012

(86) PCT No.: PCT/KR2012/005882
§ 371 (c)(1),
(2), (4) Date: Dec. 27, 2013

(87) PCT Pub. No.: WO2013/015594
PCT Pub. Date: Jan. 31, 2013

(65) Prior Publication Data
US 2014/0112291 A1   Apr. 24, 2014

Related U.S. Application Data

(60) Provisional application No. 61/511,104, filed on Jul. 24, 2011.

(51) Int. Cl.
*H04W 4/00*   (2009.01)
*H04W 72/04*   (2009.01)
*H04W 16/10*   (2009.01)
*H04W 92/20*   (2009.01)
*H04W 84/04*   (2009.01)

(52) U.S. Cl.
CPC .......... *H04W 72/0413* (2013.01); *H04W 16/10* (2013.01); *H04W 72/042* (2013.01); *H04W 84/045* (2013.01); *H04W 92/20* (2013.01)

(58) Field of Classification Search
None
See application file for complete search history.

(56) References Cited

U.S. PATENT DOCUMENTS

2013/0012249 A1* 1/2013 Centonza et al. ............. 455/501
2013/0208702 A1* 8/2013 Sandberg ..................... 370/331

OTHER PUBLICATIONS

R3-090908, Modification to X2 Setup Request and Response message, 3GPP TSG RAN WG3, 2 pages, Mar. 2009.*
Nokia Siemens Networks, et al., "Primary Component Carrier Selection, Monitoring, and Recovery" 3GPP TSG RAN WG1 #57 Meeting R1-091779 May 4-8, 2009.
Stefan Parkvall, et al., "Hetrogeneous network deployments in LTE", Ericsson Review, Feb. 2011.
Luis G.U. Garcia, et al., "Autonomous Component Carrier Selection: Interference Management in Local Area Environments for LTE-Advanced", IEEE Communications Magazine, Sep. 2009 pp. 110-116.
Ericsson, et al., "On PDCCH enhancements for CA based Het Net", 3GPP TSG RAN WG1 #68, R1-120063, Feb. 6-10, 2012.

* cited by examiner

*Primary Examiner* — Frank Duong
(74) *Attorney, Agent, or Firm* — Dentons US LLP

(57) ABSTRACT

A method and apparatus for selecting a carrier in a wireless communication system is provided. A pico eNodeB (eNB) transmits a carrier information request message including a request of information on carriers used by a macro eNB, and receives a carrier information response message as a response of the carrier information request message, the carrier information response message including the information on carriers used by the macro eNB, the information on carriers indicating information on user equipments (UEs) corresponding to the carriers used by the macro eNB. The pico eNB selects a primary cell (PCell) of the pico eNB based on the received information on carriers used by the macro eNB.

18 Claims, 13 Drawing Sheets

FIG. 3
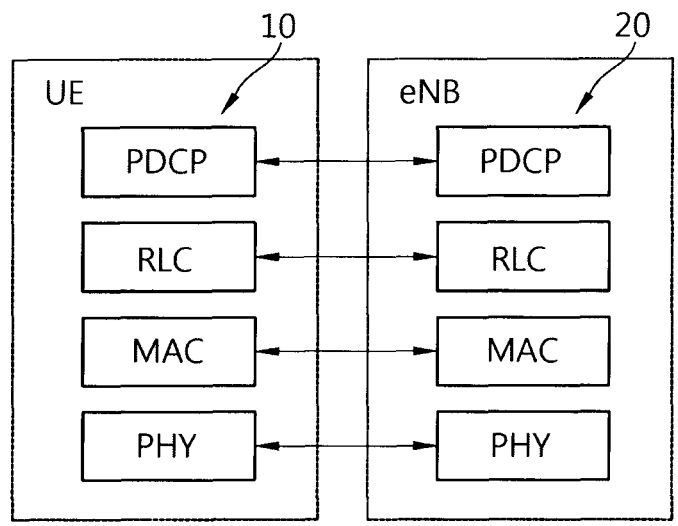
(a)
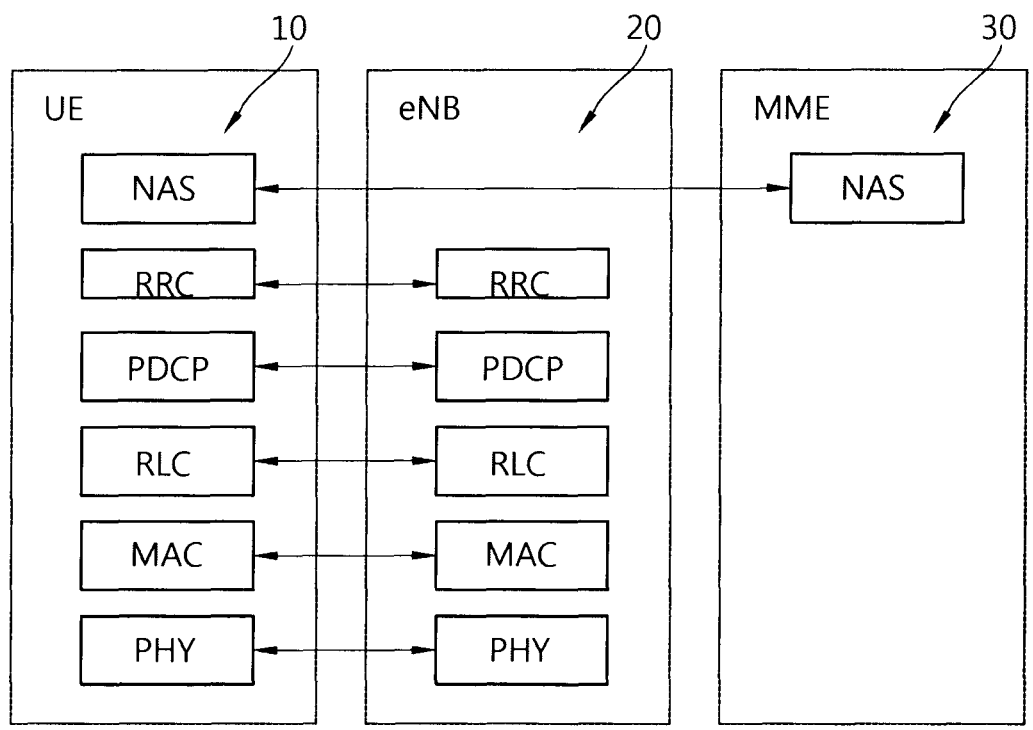
(b)

METHOD AND APPARATUS FOR SELECTING CARRIER IN WIRELESS COMMUNICATION SYSTEM

This application is a 35 USC §371 National Stage entry of International Application No. PCT/KR2012/005882, filed on Jul. 24, 2012, and claims priority of U.S. Provisional Application No. 61/511,104 filed on Jul. 24, 2011, which is hereby incorporated by reference in its entirety.

BACKGROUND OF THE INVENTION

1. Field of the Invention

The present invention relates to wireless communication, and more particularly, to a method and apparatus for selecting a carrier in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one or more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

The specification of a home eNB (HeNB) is currently ongoing in 3GPP LTE. It may be referred to Paragraph 4.6.1 of 3GPP (3rd generation partnership project) TS 36.300 V10.2.0 (2010-12). The HeNB is a small base station designed for use in residential or small business environment. The HeNB may be a femto cell. The HeNB is short range about tens of meter, installed by the consumer for better indoor voice and data reception.

FIG. 5 shows logical architecture of an E-UTRAN HeNB.

Referring to FIG. 5, a HeNB 50 may be connected with an EPC 60 through an S1 interface. A HeNB gateway (55, HeNB GW) may be deployed between the HeNB 50 and the EPC 60 to allow the S1 interface and to scale to support a large number of HeNBs. The HeNB GW 55 serves as a concentrator for the C(control)-Plane, specifically the S1-MME interface. The S1-U interface from the HeNB 50 may be terminated at the HeNB GW 55, or a direct logical U(user)-Plane connection between HeNB 50 and S-GW 56 may be used. The S1 interface may be defined as the interface between the HeNB GW 55 and the core network, between the HeNB 50 and the HeNB GW 55, between the HeNB 50 and the core network, and between the eNB and the core network. Also, the HeNB GW 55 appears to the MME as an eNB. The HeNB GW 55 appears to the HeNB as an MME. The S1 interface between the HeNB 50 and the EPC 60 is the same whether the HeNB 50 is connected to the EPC 60 via a HeNB GW 55 or not.

Inter-cell interference coordination (ICIC) has the task to manage radio resources such that inter-cell interference is kept under control. The ICIC mechanism includes a frequency domain component and time domain component. The preferred ICIC method may be different in the uplink and downlink.

Meanwhile, the 3GPP LTE rel-8 (hereinafter, rel-8) and the 3GPP LTE rel-10 (hereinafter, rel-10) ICIC mechanisms have been defined for intra-carrier cases. The rel-8 ICIC mechanism is designed for macro cell-only scenario. The Rel-10 ICIC mechanism is designed for scenarios of a macro cell and a femto cell as well as a macro cell and a pico cell. Now for 3GPP LTE rel-11, the method of autonomous interference management in a heterogeneous network (HetNet) with the mixture of different cell types and without tight synchronization requirements is regarded as a next step of further development for the optimal use of available frequency assets.

It is expected that the HetNet deployments in 3GPP LTE rel-11 basically assume that multiple carriers are used. On the other hand, 3GPP LTE rel-10 uses single carrier. Therefore, when the ICIC mechanism is applied to the HetNet deployments in 3GPP LTE rel-11, there might be a few of considerations.

SUMMARY OF THE INVENTION

The present invention provides a method and apparatus for selecting a carrier in a wireless communication system. The present invention provides a method for a pico eNB and a home eNodeB (HeNB) selecting a carrier in a heterogeneous network (HetNet).

In an aspect, a method for selecting, by a pico eNodeB, a carrier in a wireless communication system is provided. The method includes transmitting a carrier information request message including a request of information on carriers used by a macro eNB, receiving a carrier information response message as a response of the carrier information request message, the carrier information response message including the information on carriers used by the macro eNB, the information on carriers indicating information on user equipments (UEs) corresponding to the carriers used by the macro eNB, and selecting a primary cell (PCell) of the pico eNB based on the received information on carriers used by the macro eNB.

The information on UEs corresponding to the carriers used by the macro eNB may indicate the number of the UEs using the corresponding carrier as a PCell or a SCell.

The information on UEs corresponding to the carriers used by the macro eNB may indicate a resource usage status of the corresponding carrier by the UEs.

The resource usage status of the corresponding carrier by the UEs may be calculated for a downlink (DL)/uplink (UL)/total physical resource block (PRB) as defined in X2.

The carrier information request message may include cell identity (ID) related information.

The carrier information response message may include cell ID related information.

The carrier information request message may be transmitted to the macro eNB through a direct X2 interface, and the carrier information response message may be received from the macro eNB through the direct X2 interface.

The carrier information request message or the carrier information response message may be included in one of a resource status request message, resource status response message, resource status update message and load information.

The carrier information request message may be transmitted to the macro eNB directly during a direct X2 setup procedure, and the carrier information response message may be received from the macro eNB directly during the direct X2 setup procedure.

The carrier information request message may be included in an X2 setup request message, and the carrier information response message may be included in an X2 setup response message which is a response of the X2 setup request message.

The carrier information request message may be transmitted to a mobility management entity (MME) through an S1 interface, and the carrier information response message may be received from the MME through the S1 interface.

The carrier information request message may be transmitted to a MME during an S1 setup procedure, and the carrier information response message may be received from the MME during the S1 setup procedure.

In another aspect, a method for selecting, by a home eNodeB (HeNB), a carrier in a wireless communication system is provided. The method includes transmitting a carrier information request message including a request of information on carriers used by a macro eNB to a HeNB gateway (GW), receiving a carrier information response message as a response of the carrier information request message from the HeNB GW, the carrier information response message including the information on carriers used by the macro eNB, the information on carriers indicating information on user equipments (UEs) corresponding to the carriers used by the macro eNB, and selecting a PCell of the HeNB based on the received information on carriers used by the macro eNB.

Automatic self carrier selecting mechanism without the need for prior network planning can be provided.

BRIEF DESCRIPTION OF THE DRAWINGS

FIG. 3 shows a user-plane protocol and a control-plane protocol stack for the E-UMTS.

DESCRIPTION OF EXEMPLARY EMBODIMENTS

Figure 1:
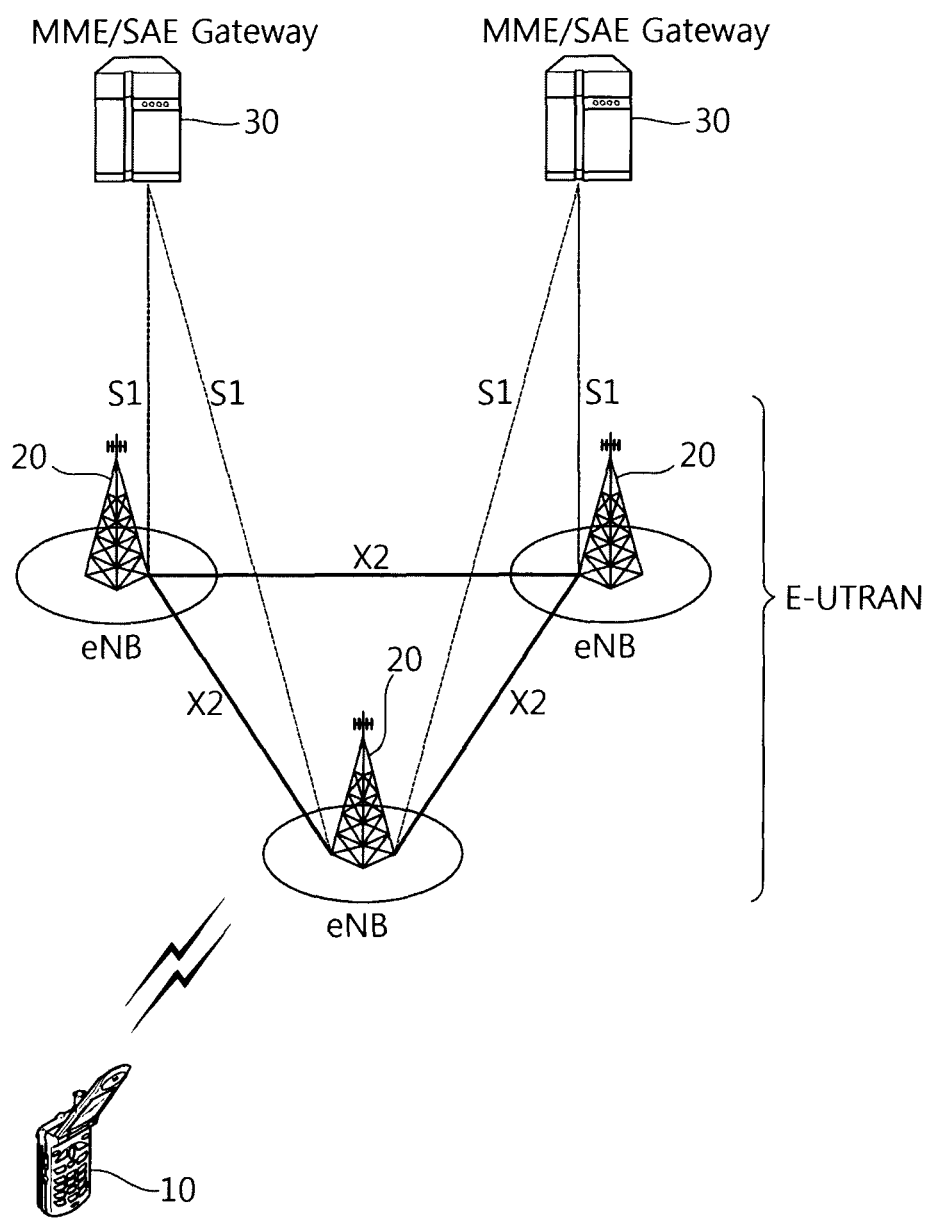
FIG. 1 shows network structure of an evolved universal mobile telecommunication system (E-UMTS). The E-UMTS may be also referred to as an LTE system.
Figure 2:
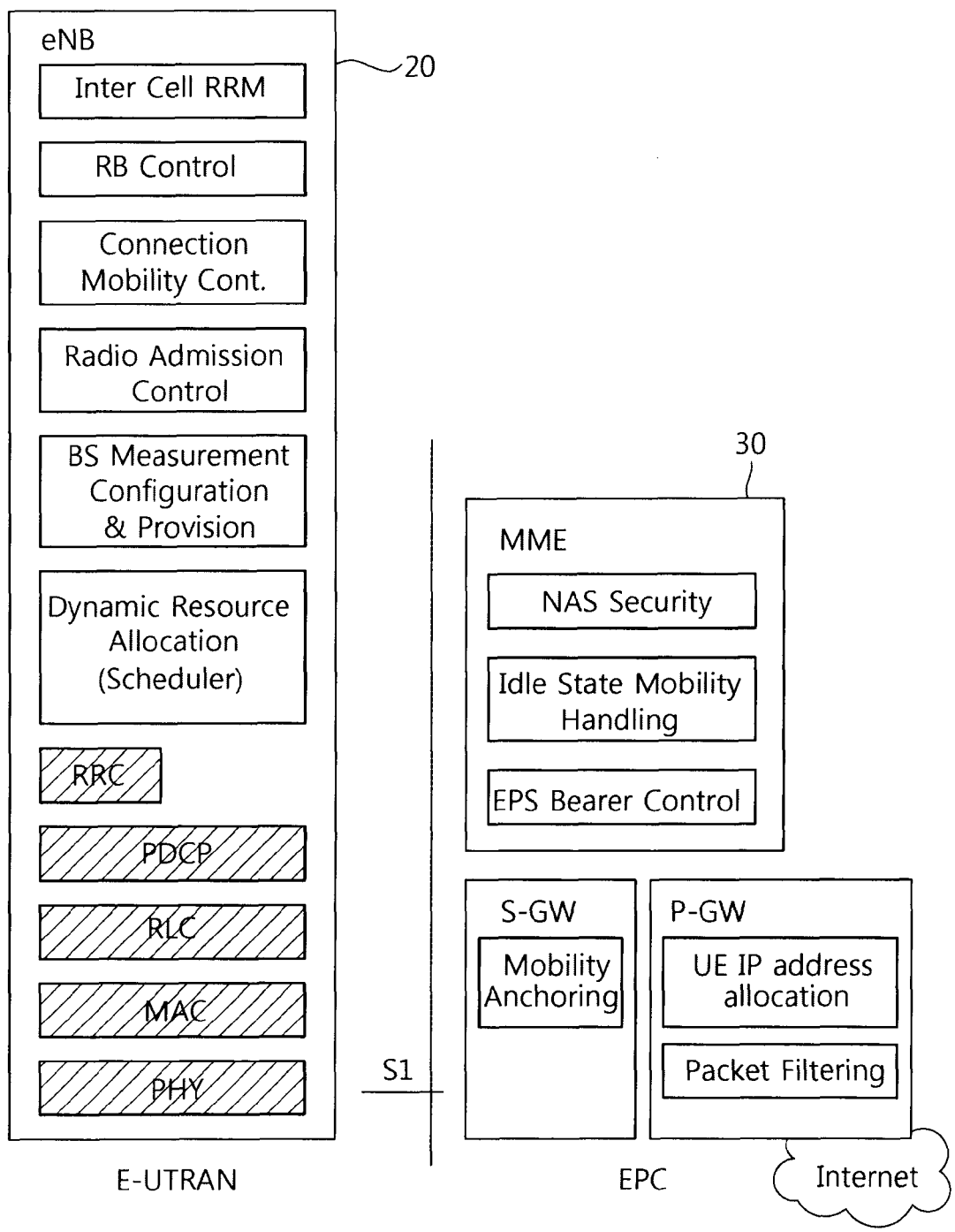
FIG. 2 shows architecture of a typical E-UTRAN and a typical EPC.
Figure 4:
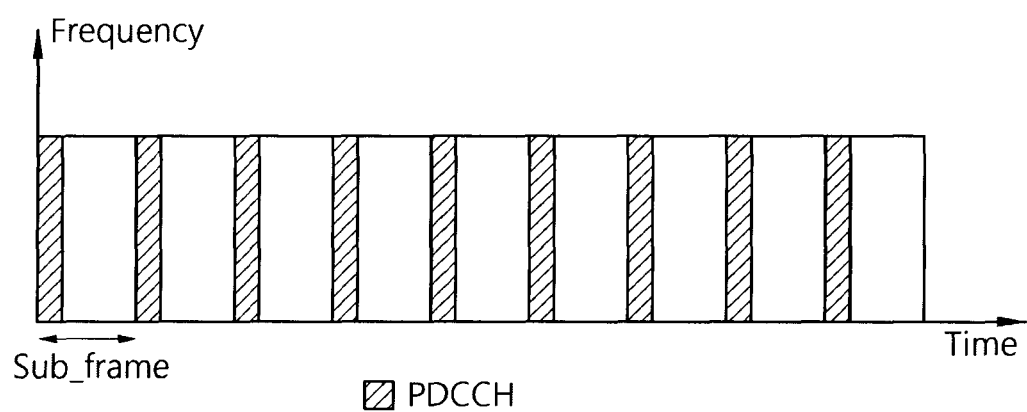
FIG. 4 shows an example of structure of a physical channel.
Figure 5:
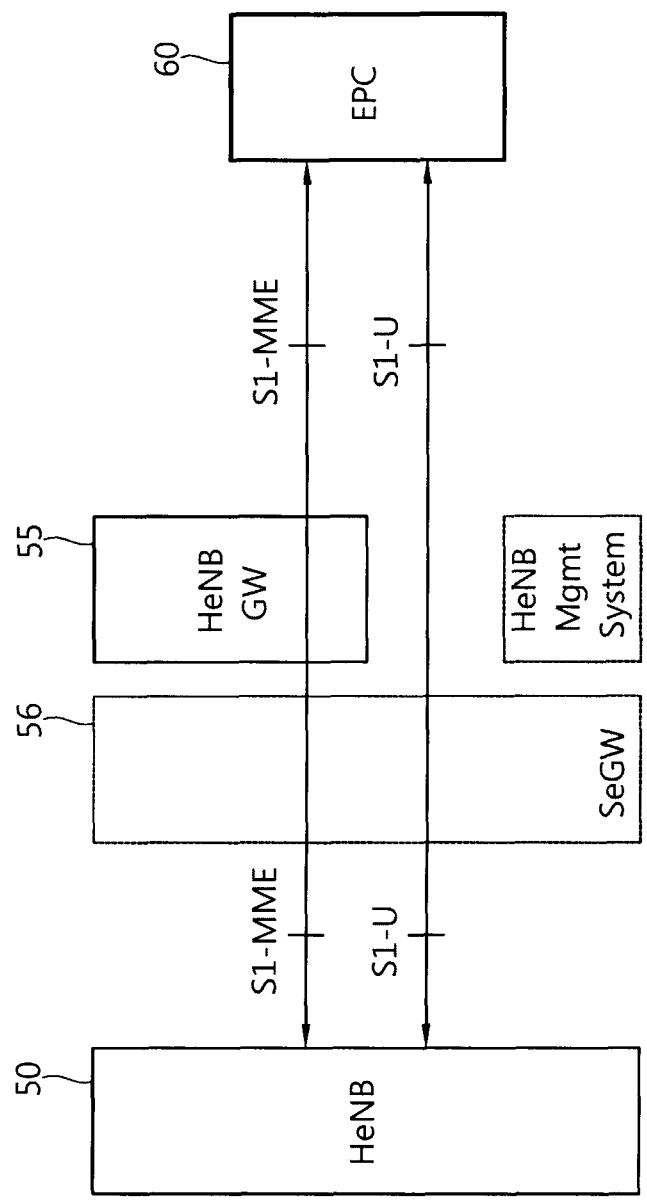
FIG. 5 shows logical architecture of an E-UTRAN HeNB.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

To meet the targets set by 3GPP LTE-A, e.g., bandwidth up to 100 MHz, peak data rates up to 1 Gbps in DL and peak data rates up to 500 Mbps in UL, carrier aggregation (CA) concept is introduced. In the CA, two or more component carriers (CCs) are aggregated in order to support wider transmission bandwidths up to 100 MHz. A UE may simultaneously receive or transmit on one or multiple CCs depending on its capabilities. That is, a rel-10 UE with reception and/or transmission capabilities for the CA can simultaneously receive and/or transmit on multiple CCs corresponding to multiple serving cells. A Rel-8/9 UE can receive on a single CC and transmit on a single CC corresponding to one serving cell only. The CA is supported for both contiguous and non-contiguous CCs. It is possible to configure a UE to aggregate a different number of CCs originating from the same eNB and of possibly different bandwidths in the UL and the DL. That is, the number of DL CCs that can be configured depends on the DL aggregation capability of the UE. The number of UL CCs that can be configured depends on the UL aggregation capability of the UE.

When the CA concept is applied to the scenarios of pico eNB (or home eNodeB (HeNB)) deployment, the pico eNB (or HeNB) can operate via a set of allowed carriers configured by operators. The basic principle is that each cell should at least select one active primary carrier. That is, in case that a new pico eNB (or HeNB) is switched on, it shall start by selecting one carrier from the available carriers as its primary cell (PCell). However, due to the lack of synchronization requirements between a macro eNB and a pico eNB (or HeNB), the interference related problems can happen between the macro eNB and the newly deployed pico eNB (or HeNB). For example, the newly deployed pico eNB (or HeNB) may select one carrier which is used by the macro eNB as its PCell from the available carriers. Besides, in case that the macro eNB and the pico eNB (or HeNB) are already working, the information on which cell is configured for the PCell/SCell(s) of the macro eNB can be a clue for the pico eNB (or HeNB) to configure its own PCell/SCell(s). This is because, again, due to the lack of synchronization requirements between the macro eNB and the pico eNB (or HeNB), the interference related problems can happen between the macro eNB and the pico eNB (or HeNB) which are already working. Thus, some enhancements are needed for the method of carrier selection in a heterogeneous network (HetNet) environment.

Figure 6:
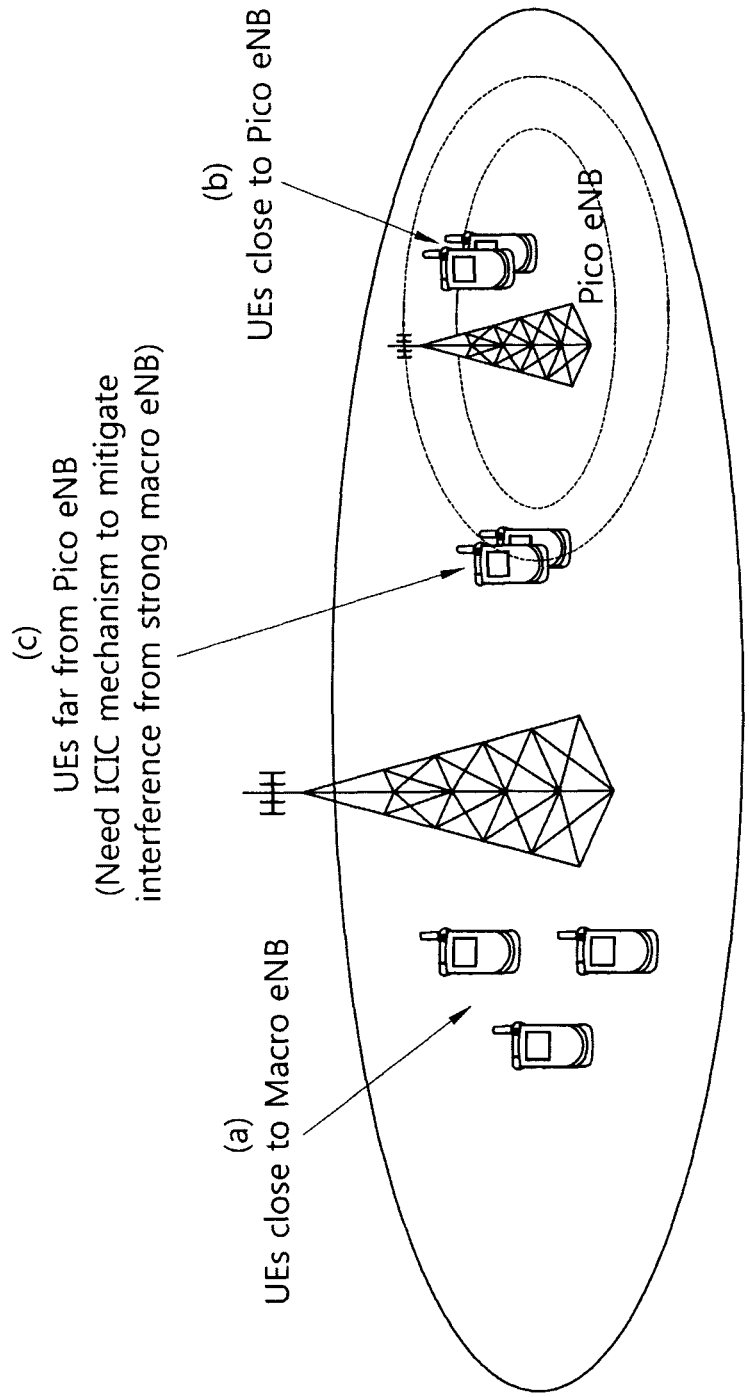
FIG. 6 shows an example of user equipments (UEs) in a HetNet.

FIG. 6 shows an example of user equipments (UEs) in a HetNet.

Referring to FIG. 6, UEs close to a macro eNB exist (FIG. 6-(a)). Also, UEs closes to a pico eNB exist (FIG. 6-(b)). Also, UEs that are served by the pico eNB while still far away from the pico eNB exist (FIG. 6-(c)). In this case (e.g., the case in FIG. 6-(c)), these UEs will in fact suffer from a strong interference from the macro eNB, which needs to be mitigated with the ICIC mechanism, in the time-domain or frequency-domain or in combination. More specifically, in the HetNet deployment scenario, a PCell is used for control/data part and a secondary cell (SCell) is used for data part with the aid of cross carrier scheduling. If the same carrier frequency is assigned for a macro UE and a pico eNB UE as their PCell, the interference on a physical downlink control channel (PDCCH) will be high. This is because the pico eNB is typically located within the coverage of the macro eNB, thus, it would be beneficial that the macro eNB and the pico eNB should configure their own PCell using different carrier. In such scenario, providing inter-eNB assistance can be beneficial to optimize the selection of resources protected from interference, while mitigating interference with available ICIC mechanisms for those UEs.

There are several ways to resolve the problems mentioned above. Hereinafter, various examples of the proposed method for selecting a carrier in a HetNet according to the present invention are described. Basically, it is assumed that the newly deployed pico eNB (or HeNB) may measure a reference signal from a macro eNB when it is powered on.

Figure 7:
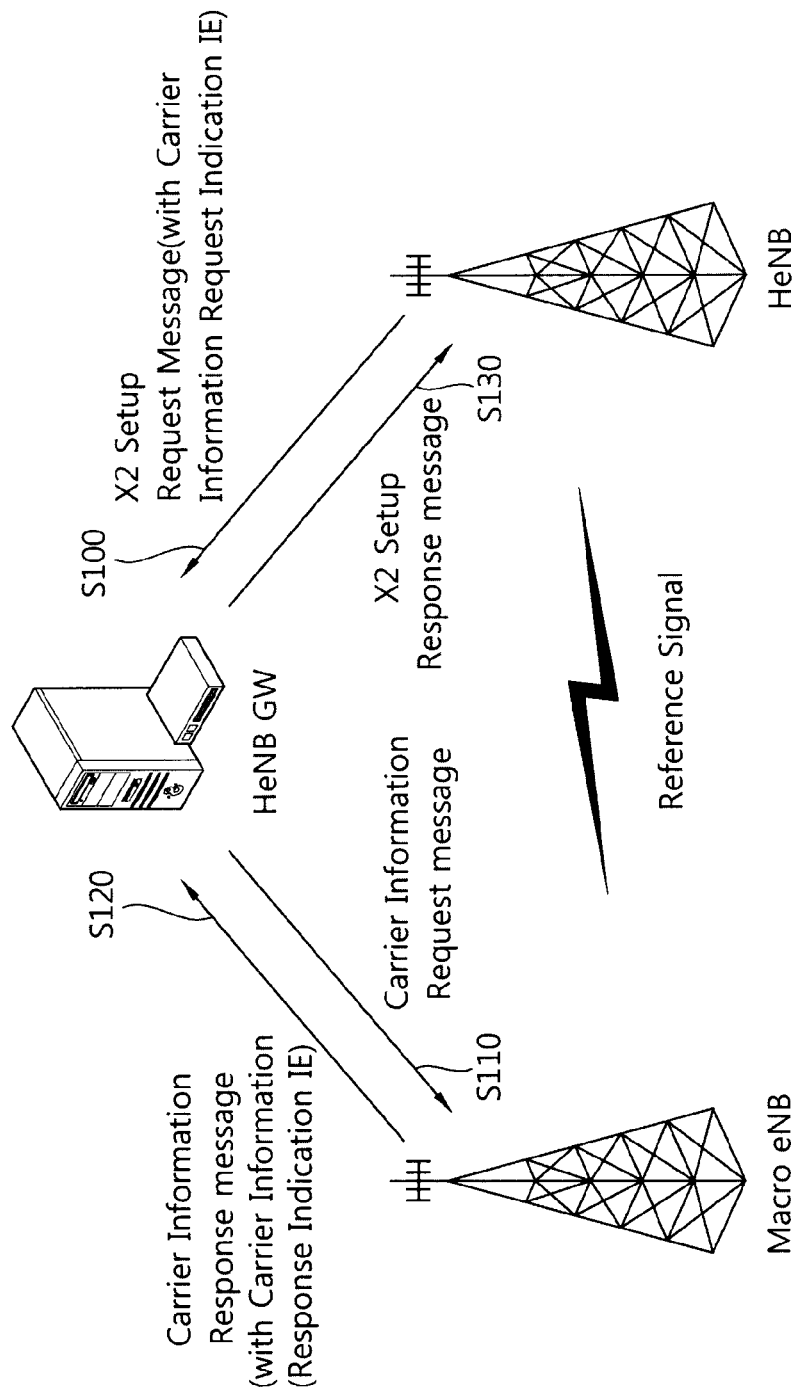
FIG. 7 shows an example of proposed method of selecting a carrier in a HetNet according to an embodiment of the present invention.

FIG. 7 shows an example of proposed method of selecting a carrier in a HetNet according to an embodiment of the present invention. This case is for the scenario where the macro eNB and the HeNB cannot setup the direct X2 interface between them.

Referring to FIG. 7, the newly deployed HeNB obtains the information required for carrier selection via the X2 setup procedure between the HeNB and the HeNB GW with the aid of the HeNB GW. Here, the HeNB is ready to first select the PCell.

At step S100, the HeNB transmits an X2 setup request message to the HeNB GW. The X2 setup request message may request the information on carriers used by the macro eNB by triggering the X2 setup procedure. The X2 setup request message may include carrier information request indication IE (information element) to obtain the information on the carriers used by the macro eNB received through the reference signal. The carrier information request indication IE may be added for the total number of carriers detected by the HeNB. Each carrier information request indication IE may include following information:

Cell ID related information: physical cell ID (PCI), E-UTRAN cell global ID (ECGI), etc
Other possible cell related information to identify the carriers used by the macro eNB received through the reference signal At step S110, the HeNB GW transmits a carrier information request message to the macro eNB. The carrier information request message may include the carrier information request indication IE included in the X2 setup request message.

At step S120, the macro eNB transmits a carrier information response message to the HeNB GW as a response of the carrier information request message. The carrier information response message may include carrier information response indication IE for the carriers mainly used by the macro eNB. The carrier information response indication IE may be added for the total number of carriers. Each carrier information response indication IE may include following information:

Cell ID related information: PCI, ECGI, etc
Other possible cell related information to identify the carriers used by the macro eNB received through the reference signal
UE ratio indication IE: the number of UEs using this carrier as a PCell (primary high density, primary medium density, primary low density)
UE ratio indication IE: the number of UEs using this carrier as a SCell (secondary high density, secondary medium density, secondary low density}
resource usage status IE: resource usage status of corresponding carrier by UEs (high use, medium use, low use)—The resource usage status may be calculated for the DL/UL/total physical resource block (PRB) as defined in X2.

At step S130, the HeNB GW transmits an X2 setup response message to the HeNB as a response of the X2 setup request message. The X2 setup response message may include the carrier information response indication IE included in the carrier information response message.

When the HeNB receives the X2 setup response message from the HeNB GW, the HeNB may flexibly select its PCell based on the received information for mitigating the interference between itself and the neighbor macro eNB. There may be several possible cases to use the combination of information explained above. For example, if the UE ratio indication IE indicates high density, which means that many UEs use this carrier as a PCell and/or SCell, the HeNB may avoid using this carrier as a PCell. Although the UE ratio indication IE indicates medium density or low density, if the resource usage status IE indicates high use, then the HeNB may avoid using this carrier as a PCell. In this way, the coordinated/uncoordinated deployment of HeNB will benefit from having support of automatic carrier selection method.

Figure 8:
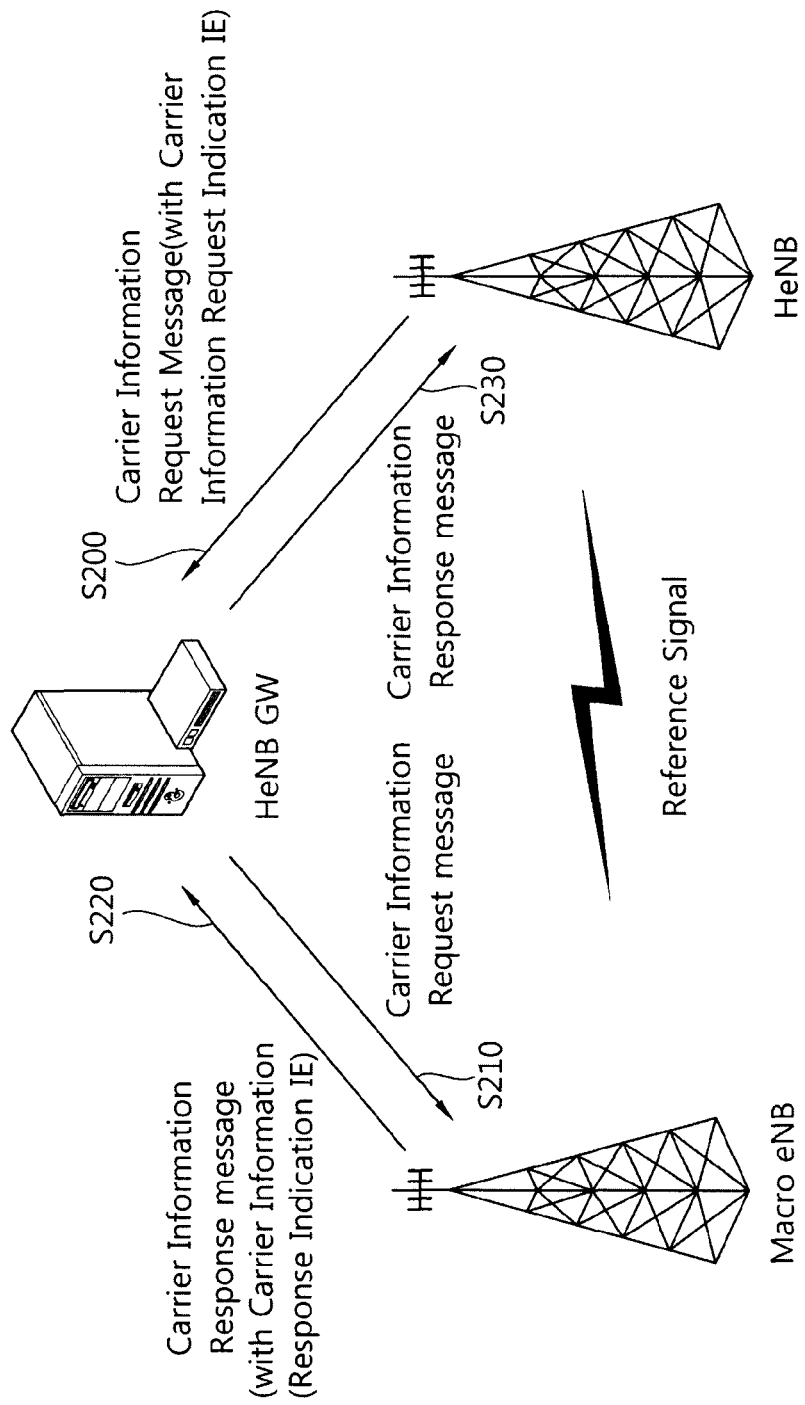
FIG. 8 shows another example of proposed method of selecting a carrier in a HetNet according to an embodiment of the present invention.

FIG. 8 shows another example of proposed method of selecting a carrier in a HetNet according to an embodiment of the present invention. This case is also for the scenario where the macro eNB and the HeNB cannot setup the direct X2 interface between them. This example may be performed after the indirect X2 interface is setup between the HeNB and the HeNB GW.

Referring to FIG. 8, the HeNB obtains the information required for carrier selection via a carrier information exchange procedure between the HeNB and the macro eNB with the aid of the HeNB GW. Here, the HeNB is ready to select the PCell.

At step S200, the HeNB transmits a carrier information request message message to the HeNB GW. The carrier information request message may request the information on carriers used by the macro eNB by triggering the carrier information exchange procedure. The carrier information request message may include carrier information request indication IE to obtain the information on the carriers used by the macro eNB received through the reference signal. The carrier information request indication IE may be added for the total number of carriers detected by the HeNB. Each carrier information request indication IE may include following information:

Cell ID related information: PCI, ECGI, etc
Other possible cell related information to identify the carriers used by the macro eNB received through the reference signal At step S210, the HeNB GW forwards the carrier information request message to the macro eNB.

At step S220, the macro eNB transmits a carrier information response message to the HeNB GW as a response of the carrier information request message. The carrier information response message may include carrier information response indication IE for the carriers mainly used by the macro eNB. The carrier information response indication IE may be added for the total number of carriers. Each carrier information response indication IE may include following information:

Cell ID related information: PCI, ECGI, etc
Other possible cell related information to identify the carriers used by the macro eNB received through the reference signal
UE ratio indication IE: the number of UEs using this carrier as a PCell (primary high density, primary medium density, primary low density)
UE ratio indication IE: the number of UEs using this carrier as a SCell (secondary high density, secondary medium density, secondary low density}
resource usage status IE: resource usage status of corresponding carrier by UEs (high use, medium use, low use)—The resource usage status may be calculated for the DL/UL/total physical resource block (PRB) as defined in X2.

At step S230, the HeNB GW forwards the carrier information response message to the HeNB.

When the HeNB receives the carrier information response message from the HeNB GW, the HeNB may flexibly select its PCell based on the received information for mitigating the interference between itself and the neighbor macro eNB. There may be several possible cases to use the combination of information explained above. For example, if the UE ratio indication IE indicates high density, which means that many UEs use this carrier as a PCell and/or SCell, the HeNB may avoid using this carrier as a PCell. Although the UE ratio indication IE indicates medium density or low density, if the resource usage status IE indicates high use, then the HeNB may avoid using this carrier as a PCell. In this way, the coordinated/uncoordinated deployment of HeNB will benefit from having support of automatic carrier selection method.

Figure 9:
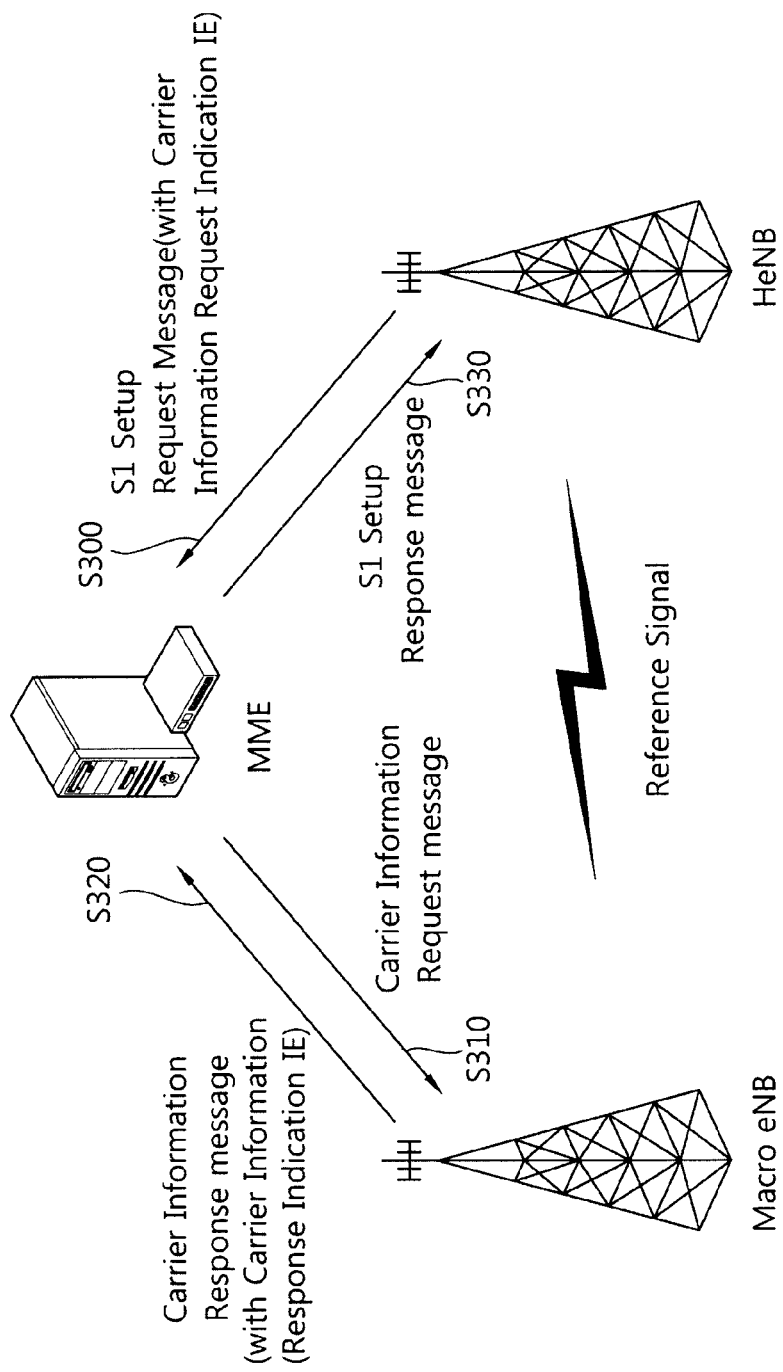
FIG. 9 shows another example of proposed method of selecting a carrier in a HetNet according to an embodiment of the present invention.

FIG. 9 shows another example of proposed method of selecting a carrier in a HetNet according to an embodiment of the present invention. This case is also for the scenario where the macro eNB and the HeNB cannot setup the direct X2 interface between them.

The carrier information request/response messages mentioned above are the simple examples of messages exchanged between the macro eNB and the HeNB to achieve the interference mitigation between them. That is, the carrier information request/response indications described in the above examples may be substituted with the existing X2 messages, e.g., resource status request/response/update message, load information message, etc.

Referring to FIG. 9, the newly deployed HeNB obtains the information required for carrier selection via the S1 setup procedure between the HeNB and the MME with the aid of the MME. Here, the HeNB is ready to first select the PCell.

At step S300, the HeNB transmits an S1 setup request message to the MME. The S1 setup request message may request the information on carriers used by the macro eNB by triggering the S1 setup procedure. The S1 setup request message may include carrier information request indication IE to obtain the information on the carriers used by the macro eNB received through the reference signal. The carrier information request indication IE may be added for the total number of carriers detected by the HeNB. Each carrier information request indication IE may include following information:
  Cell ID related information: PCI, ECGI, etc
  Other possible cell related information to identify the carriers used by the macro eNB received through the reference signal At step S310, the MME transmits a carrier information request message to the macro eNB. The carrier information request message may include the carrier information request indication IE included in the S1 setup request message.

At step S320, the macro eNB transmits a carrier information response message to the MME as a response of the carrier information request message. The carrier information response message may include carrier information response indication IE for the carriers mainly used by the macro eNB. The carrier information response indication IE may be added for the total number of carriers. Each carrier information response indication IE may include following information:
  Cell ID related information: PCI, ECGI, etc
  Other possible cell related information to identify the carriers used by the macro eNB received through the reference signal
    UE ratio indication IE: the number of UEs using this carrier as a PCell (primary high density, primary medium density, primary low density)
    UE ratio indication IE: the number of UEs using this carrier as a SCell (secondary high density, secondary medium density, secondary low density}
    resource usage status IE: resource usage status of corresponding carrier by UEs (high use, medium use, low use)—The resource usage status may be calculated for the DL/UL/total physical resource block (PRB) as defined in X2.

At step S330, the MME transmits an S1 setup response message to the HeNB as a response of the S1 setup request message. The S1 setup response message may include the carrier information response indication IE included in the carrier information response message.

When the HeNB receives the S1 setup response message from the MME, the HeNB may flexibly select its PCell based on the received information for mitigating the interference between itself and the neighbor macro eNB. There may be several possible cases to use the combination of information explained above. For example, if the UE ratio indication IE indicates high density, which means that many UEs use this carrier as a PCell and/or SCell, the HeNB may avoid using this carrier as a PCell. Although the UE ratio indication IE indicates medium density or low density, if the resource usage status IE indicates high use, then the HeNB may avoid using this carrier as a PCell. In this way, the coordinated/uncoordinated deployment of HeNB will benefit from having support of automatic carrier selection method.

Figure 10:
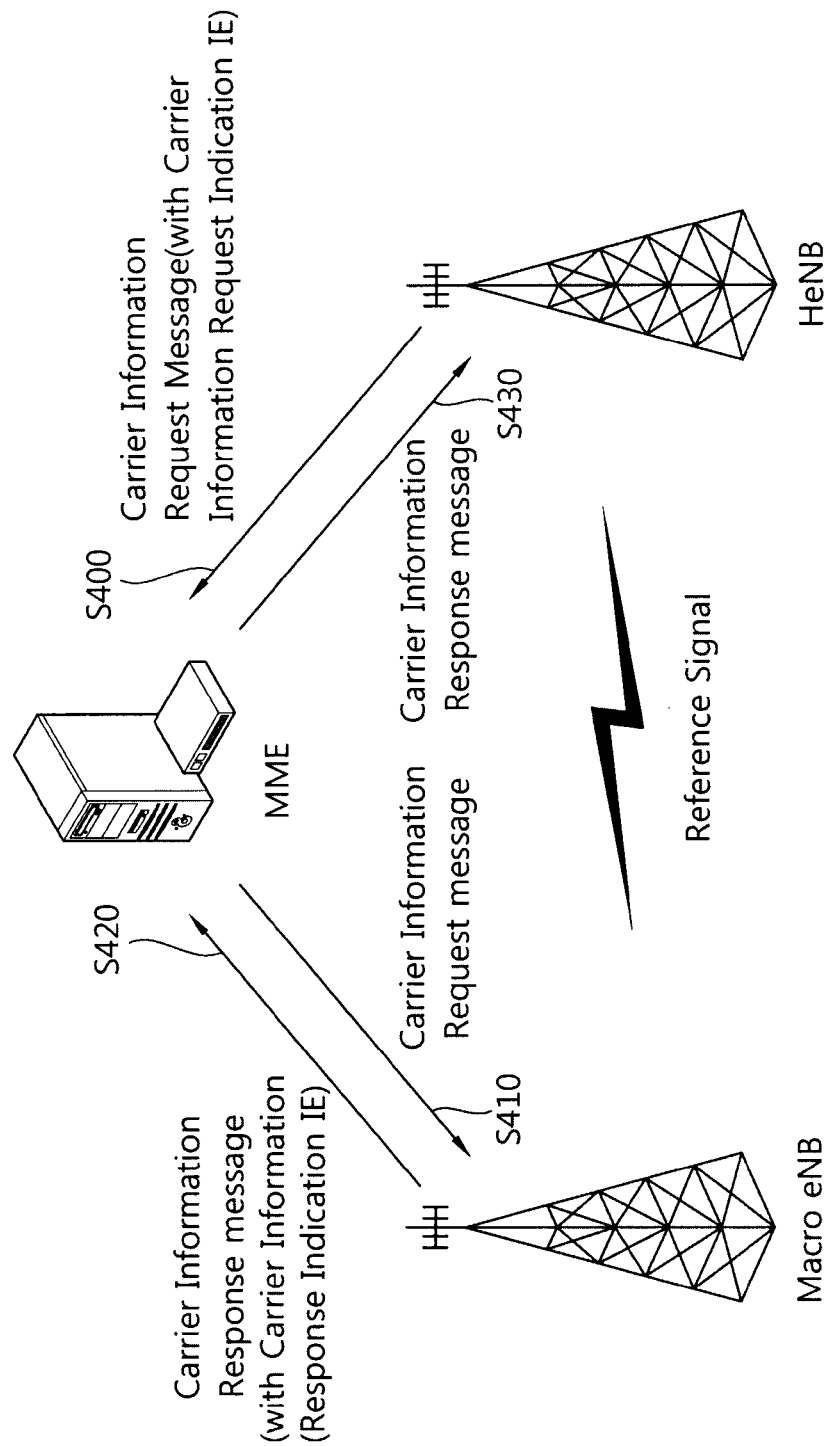
FIG. 10 shows another example of proposed method of selecting a carrier in a HetNet according to an embodiment of the present invention.

FIG. 10 shows another example of proposed method of selecting a carrier in a HetNet according to an embodiment of the present invention. This case is also for the scenario where the macro eNB and the HeNB cannot setup the direct X2 interface between them. This example may be performed after the S1 interface is setup between the HeNB and the MME.

Referring to FIG. 10, the HeNB obtains the information required for carrier selection via a carrier information exchange procedure between the HeNB and the macro eNB with the aid of the MME. Here, the HeNB is ready to select the PCell.

At step S400, the HeNB transmits a carrier information request message message to the MME. The carrier information request message may request the information on carriers used by the macro eNB by triggering the carrier information exchange procedure. The carrier information request message may include carrier information request indication IE to obtain the information on the carriers used by the macro eNB received through the reference signal. The carrier information request indication IE may be added for the total number of carriers detected by the HeNB. Each carrier information request indication IE may include following information:
  Cell ID related information: PCI, ECGI, etc
  Other possible cell related information to identify the carriers used by the macro eNB received through the reference signal At step S410, the MME forwards the carrier information request message to the macro eNB.

At step S420, the macro eNB transmits a carrier information response message to the MME as a response of the carrier information request message. The carrier information response message may include carrier information response indication IE for the carriers mainly used by the macro eNB. The carrier information response indication IE may be added for the total number of carriers. Each carrier information response indication IE may include following information:
  Cell ID related information: PCI, ECGI, etc
  Other possible cell related information to identify the carriers used by the macro eNB received through the reference signal
    UE ratio indication IE: the number of UEs using this carrier as a PCell (primary high density, primary medium density, primary low density)
    UE ratio indication IE: the number of UEs using this carrier as a SCell (secondary high density, secondary medium density, secondary low density}
    resource usage status IE: resource usage status of corresponding carrier by UEs (high use, medium use, low use)—The resource usage status may be calculated for the DL/UL/total physical resource block (PRB) as defined in X2.

At step S430, the MME forwards the carrier information response message to the HeNB.

When the HeNB receives the carrier information response message from the MME, the HeNB may flexibly select its PCell based on the received information for mitigating the interference between itself and the neighbor macro eNB. There may be several possible cases to use the combination of information explained above. For example, if the UE ratio indication IE indicates high density, which means that many UEs use this carrier as a PCell and/or SCell, the HeNB may avoid using this carrier as a PCell. Although the UE ratio indication IE indicates medium density or low density, if the resource usage status IE indicates high use, then the HeNB may avoid using this carrier as a PCell. In this way, the uncoordinated deployment of HeNB will benefit from having support of automatic carrier selection method.

The carrier information request/response messages mentioned above are the simple examples of messages exchanged between the macro eNB and the HeNB to achieve the interference mitigation between them. That is, the carrier information request/response indications described in the above examples may be substituted with the existing X2 messages, e.g., resource status request/response/update message, load information message, etc. The examples described in FIG. 9 and FIG. 10 assume that the present invention is applied in case of the HeNB is deployed. However, the present invention is not limited thereto. The present invention may be applied in case of a pico eNB is deployed. That is, the HeNB described in FIG. 9 and FIG. 10 can be replaced with the pico eNB.

Figure 11:
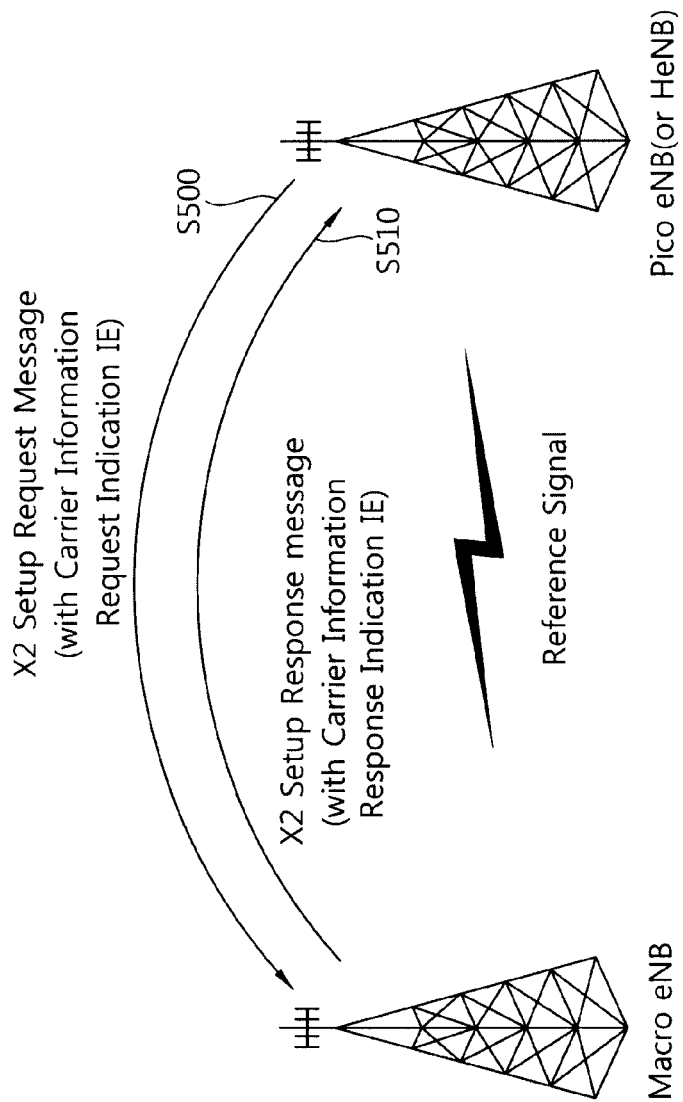
FIG. 11 shows another example of proposed method of selecting a carrier in a HetNet according to an embodiment of the present invention.

FIG. 11 shows another example of proposed method of selecting a carrier in a HetNet according to an embodiment of the present invention. This case is for the scenario where the macro eNB and the pico eNB (or HeNB) can setup the direct X2 interface between them.

Referring to FIG. 11, the newly deployed pico eNB (or HeNB) obtains the information required for carrier selection via the X2 setup procedure directly between the pico eNB (or HeNB) and the macro eNB. Here, the pico eNB (or HeNB) is ready to first select the PCell.

At step S500, the pico eNB (or HeNB) transmits an X2 setup request message to the macro eNB. The X2 setup request message may request the information on carriers used by the macro eNB by triggering the X2 setup procedure. The X2 setup request message may include carrier information request indication IE to obtain the information on the carriers used by the macro eNB received through the reference signal. The carrier information request indication IE may be added for the total number of carriers detected by the pico eNB (or HeNB). Each carrier information request indication IE may include following information:

Cell ID related information: PCI, ECGI, etc
Other possible cell related information to identify the carriers used by the macro eNB received through the reference signal At step S510, the macro eNB transmits an X2 setup response message to the pico eNB (or HeNB) as a response of the X2 setup request message. The X2 setup response message may include carrier information response indication IE for the carriers mainly used by the macro eNB. The carrier information response indication IE may be added for the total number of carriers. Each carrier information response indication IE may include following information:

Cell ID related information: PCI, ECGI, etc
Other possible cell related information to identify the carriers used by the macro eNB received through the reference signal
UE ratio indication IE: the number of UEs using this carrier as a PCell (primary high density, primary medium density, primary low density)
UE ratio indication IE: the number of UEs using this carrier as a SCell (secondary high density, secondary medium density, secondary low density}
resource usage status IE: resource usage status of corresponding carrier by UEs (high use, medium use, low use)—The resource usage status may be calculated for the DL/UL/total physical resource block (PRB) as defined in X2.

When the pico eNB (or HeNB) receives the X2 setup response message from the macro eNB, the pico eNB (or HeNB) may flexibly select its PCell based on the received information for mitigating the interference between itself and the neighbor macro eNB. There may be several possible cases to use the combination of information explained above. For example, if the UE ratio indication IE indicates high density, which means that many UEs use this carrier as a PCell and/or SCell, the pico eNB (or HeNB) may avoid using this carrier as a PCell. Although the UE ratio indication IE indicates medium density or low density, if the resource usage status IE indicates high use, then the pico eNB (or HeNB) may avoid using this carrier as a PCell. In this way, the deployment of pico eNB (or HeNB) will benefit from having support of automatic carrier selection method.

Figure 12:
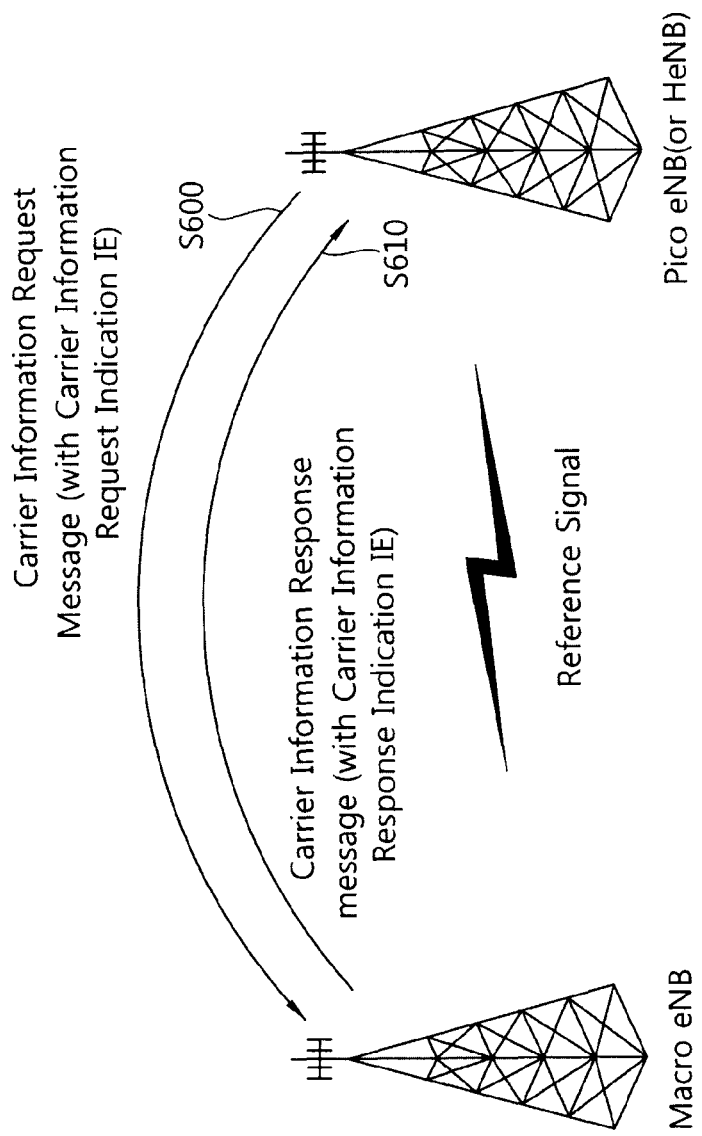
FIG. 12 shows another example of proposed method of selecting a carrier in a HetNet according to an embodiment of the present invention.

FIG. 12 shows another example of proposed method of selecting a carrier in a HetNet according to an embodiment of the present invention. This case is also for the scenario where the macro eNB and the pico eNB (or HeNB) can setup the direct X2 interface between them. This example may be performed after the direct X2 interface is setup between the pico eNB (or HeNB) and the macro eNB.

Referring to FIG. 12, the pico eNB (or HeNB) obtains the information required for carrier selection via the carrier information exchange procedure directly between the pico eNB (or HeNB) and the macro eNB. Here, the pico eNB (or HeNB) is ready to select the PCell.

At step S600, the pico eNB (or HeNB) transmits a carrier information request message to the macro eNB. The carrier information request message may request the information on carriers used by the macro eNB by triggering the carrier information exchange procedure. The carrier information request message may include carrier information request indication IE to obtain the information on the carriers used by the macro eNB received through the reference signal. The carrier information request indication IE may be added for the total number of carriers detected by the pico eNB (or HeNB). Each carrier information request indication IE may include following information:

Cell ID related information: physical cell ID (PCI), E-UTRAN cell global ID (ECGI), etc
Other possible cell related information to identify the carriers used by the macro eNB received through the reference signal At step S610, the macro eNB transmits a carrier information response message to the pico eNB (or HeNB) as a response of the carrier information request message. The carrier information response message may include carrier information response indication IE for the carriers mainly used by the macro eNB. The carrier information response indication IE may be added for the total number of carriers. Each carrier information response indication IE may include following information:

Cell ID related information: PCI, ECGI, etc
Other possible cell related information to identify the carriers used by the macro eNB received through the reference signal
    UE ratio indication IE: the number of UEs using this carrier as a PCell (primary high density, primary medium density, primary low density)
    UE ratio indication IE: the number of UEs using this carrier as a SCell (secondary high density, secondary medium density, secondary low density}
        resource usage status IE: resource usage status of corresponding carrier by UEs (high use, medium use, low use)—The resource usage status may be calculated for the DL/UL/total physical resource block (PRB) as defined in X2.

When the pico eNB (or HeNB) receives the carrier information response message from the macro eNB, the pico eNB (or HeNB) may flexibly select its PCell based on the received information for mitigating the interference between itself and the neighbor macro eNB. There may be several possible cases to use the combination of information explained above. For example, if the UE ratio indication IE indicates high density, which means that many UEs use this carrier as a PCell and/or SCell, the pico eNB (or HeNB) may avoid using this carrier as a PCell. Although the UE ratio indication IE indicates medium density or low density, if the resource usage status IE indicates high use, then the pico eNB (or HeNB) may avoid using this carrier as a PCell. In this way, the deployment of pico eNB (or HeNB) will benefit from having support of automatic carrier selection method.

The carrier information request/response messages mentioned above are the simple examples of messages exchanged between the macro eNB and the pico eNB (or HeNB) to achieve the interference mitigation between them. That is, the carrier information request/response indications described in the above examples may be substituted with the existing X2 messages, e.g., resource status request/response/update message, load information message, etc.

Figure 13:
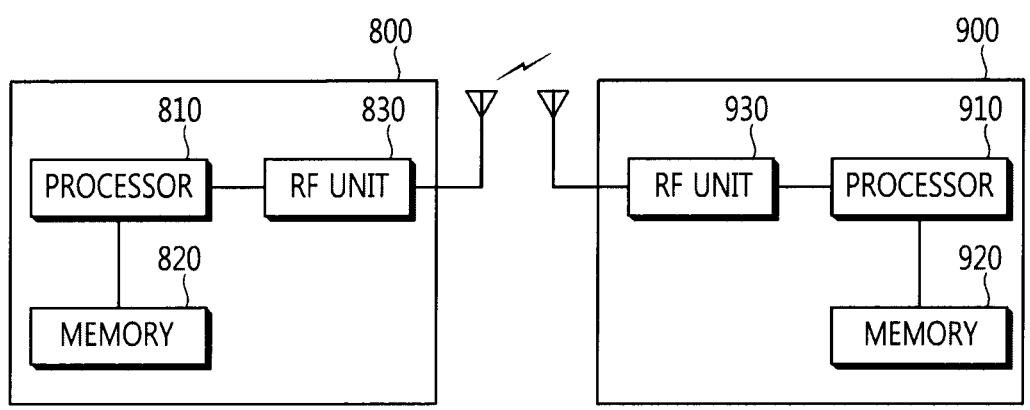
FIG. 13 is a block diagram showing wireless communication system to implement an embodiment of the present invention.

FIG. 13 is a block diagram showing wireless communication system to implement an embodiment of the present invention.

A pico eNB or HeNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A macro eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for selecting, by a pico eNodeB (eNB), a carrier in a wireless communication system, the method comprising:
    receiving reference signals from a macro eNB via a first carrier component and a second carrier component;
    transmitting a carrier information request message including a request of information on the first carrier component and the second carrier component;
    receiving a carrier information response message as a response of the carrier information request message; and
    selecting a primary cell (PCell) of the pico eNB based on the information on the first carrier component and the information on the second carrier component,
    wherein the carrier information request message includes information to identify each of the first carrier component and the second carrier component,
    wherein the carrier information response message includes information on the first carrier component and information on the second carrier component,
    wherein the information on the first carrier component includes a first user equipment (UE) ratio indication information element (IE) for the first carrier component and a first resource usage status IE for the first carrier component, and
    wherein the information on the second carrier component includes a second UE ratio indication IE for the second carrier component and a second resource usage status IE for the second carrier component.

2. The method of claim 1, wherein the first UE ratio indication IE includes information on a number of first UEs using the first carrier component as a primary carrier and information on a number of second UEs using the first carrier component as a secondary carrier, and wherein the second UE ratio indication IE includes information on a number of third UEs using the second carrier component as the primary carrier and information on a number of fourth UEs using the second carrier component as the secondary carrier.

3. The method of claim 2, wherein the first resource usage status IE includes information on a resource usage status of the first carrier component by the first UE and a resource usage status of the first carrier component by the second UE, and wherein the second resource usage status IE includes information on a resource usage status of the second carrier component by the third UE and a resource usage status of the second carrier component by the fourth UE.

4. The method of claim 3, wherein the resource usage status of the first carrier component by the first UE is calculated for a downlink (DL)/uplink (UL)/total physical resource block (PRB) as defined in X2.

5. The method of claim 1, wherein the carrier information request message further includes cell identity (ID) related information.

6. The method of claim 1, wherein the carrier information response message further includes cell ID related information.

7. The method of claim 1, wherein the carrier information request message is transmitted to the macro eNB through a direct X2 interface, and wherein the carrier information response message is received from the macro eNB through the direct X2 interface.

8. The method of claim 7, wherein the carrier information request message or the carrier information response message is included in one of a resource status request message, resource status response message, resource status update message and load information.

9. The method of claim 1, wherein the carrier information request message is transmitted to the macro eNB directly during a direct X2 setup procedure, and wherein the carrier information response message is received from the macro eNB directly during the direct X2 setup procedure.

10. The method of claim 9, wherein the carrier information request message is included in an X2 setup request message, and wherein the carrier information response message is included in an X2 setup response message which is a response of the X2 setup request message.

11. The method of claim 1, wherein the carrier information request message is transmitted to a mobility management entity (MME) through an S1 interface, and wherein the carrier information response message is received from the MME through the S1 interface.

12. The method of claim 1, wherein the carrier information request message is transmitted to a MME during an S1 setup procedure, and wherein the carrier information response message is received from the MME during the S1 setup procedure.

13. A method for selecting, by a home eNodeB (HeNB), a carrier in a wireless communication system, the method comprising:

receiving reference signals from a macro eNB via a first carrier component and a second carrier component;

transmitting a carrier information request message including a request of information on the first carrier component and the second carrier component to a HeNB gateway (GW);

receiving a carrier information response message as a response of the carrier information request message from the HeNB GW; and selecting a primary cell (PCell) of the HeNB based on the received information on the first carrier component and the second carrier component, wherein the carrier information request message includes information to identify each of the first carrier component and the second carrier component, wherein the carrier information response message includes information on the first carrier component and information on the second carrier component, wherein the information on the first carrier component includes a first user equipment (UE) ratio indication information element (IE) for the first carrier component and a first resource usage status IE for the first carrier component, and wherein the information on the second carrier component includes a second UE ratio indication IE for the second carrier component and a second resource usage status IE for the second carrier component.

14. The method of claim 13, wherein the first UE ratio indication IE includes information on a number of first UEs using the first carrier component as a primary carrier and information on a number of second UEs using the first carrier component as a secondary carrier, and wherein the second UE ratio indication IE includes information on a number of third UEs using the second carrier component as the primary carrier and information on a number of fourth UEs using the second carrier component as the secondary carrier.

15. The method of claim 13, wherein the first resource usage status IE includes information on a resource usage status of the first carrier component by the first UE and a resource usage status of the first carrier component by the second UE, and wherein the second resource usage status IE includes information on a resource usage status of the second carrier component by the third UE and a resource usage status of the second carrier component by the fourth UE.

16. A pico eNodeB (eNB) selecting a carrier in a wireless communication system, the pico eNodeB comprising:

a radio frequency (RF) unit configured to transmit or receive radio signal; and a processor operatively connected to the RF unit and configured to:

receive reference signals from a macro eNB via a first carrier component and a second carrier component;

transmit a carrier information request message including a request of information on the first carrier component and the second carrier component;

receive a carrier information response message as a response of the carrier information request message; and select a primary cell (PCell) of the pico eNB based on the information on the first carrier component and the information on the second carrier component, wherein the carrier information request message includes information to identify each of the first carrier component and the second carrier component, wherein the carrier information response message includes information on the first carrier component and information on the second carrier component, wherein the information on the first carrier component includes a first user equipment (UE) ratio indication information element (IE) for the first carrier component and a first resource usage status IEs for the first carrier component, and wherein the information on the second carrier component includes a second UE ratio indication IE for the second carrier component and a second resource usage status IE for the second carrier component.

17. The pico eNodeB of claim 16, wherein the first UE ratio indication IE includes information on a number of first UEs using the first carrier component as a primary carrier and information on a number of second UEs using the first carrier component as a secondary carrier, and wherein the second UE ratio indication IE includes information on a number of third UEs using the second carrier component as the primary carrier and information on a number of fourth UEs using the second carrier component as the secondary carrier.

18. The pico eNodeB of claim 17, wherein the first resource usage status IE includes information on a resource usage status of the first carrier component by the first UE and a resource usage status of the first carrier component by the second UE, and wherein the second resource usage status IE includes information on a resource usage status of the second carrier component by the third UE and a resource usage status of the second carrier component by the fourth UE.

* * * * *